(12) United States Patent
Pfister

(10) Patent No.: US 6,189,843 B1
(45) Date of Patent: Feb. 20, 2001

(54) LINEAR MOTION TABLE LEG

(76) Inventor: Joel W. Pfister, 4967 Kensington Gate, Shorewood, MN (US) 55331

( * ) Notice: Under 35 U.S.C. 154(b), the term of this patent shall be extended for 0 days.

(21) Appl. No.: 09/326,281

(22) Filed: Jun. 4, 1999

(51) Int. Cl.[7] .................................................. F16M 11/00
(52) U.S. Cl. ........................ 248/161; 248/157; 248/188.5
(58) Field of Search ..................................... 248/161, 157, 248/188.1, 188.2, 188.5, 295.11, 298.1, 132; 384/53, 50, 54, 52, 56; 297/344.18, 423.1; 108/144.1, 147.19; 403/104

(56) References Cited

U.S. PATENT DOCUMENTS

| | | | |
|---|---|---|---|
| 3,469,893 | 9/1969 | Hudson | 384/54 |
| 3,887,155 | * 6/1975 | Beralot | 248/333 |
| 4,183,689 | 1/1980 | Wirges et al. | 403/31 |
| 4,429,922 | * 2/1984 | Pfluger | 308/6 R |
| 5,004,203 | 4/1991 | Fabius | 248/285 |
| 5,222,705 | * 6/1993 | Gibran et al. | 248/170 |
| 5,820,088 | 10/1998 | Chapman | 248/161 |
| 5,909,861 | * 6/1999 | Korson | 248/157 |

* cited by examiner

*Primary Examiner*—Ramon O. Ramirez
*Assistant Examiner*—Gwendolyn Baxter
(74) *Attorney, Agent, or Firm*—Hugh D. Jaeger

(57) ABSTRACT

Linear motion table leg hereby a linear motion assembly is located between a base and a table top mounting plate. Arrays of rollers, some of which are spring loaded, are spaced at 120° and disposed between a configured inner tube and an outer tube to provide for rollerable interfacing between the configured inner tube and the outer tube. A gas spring is centrally located to provide for linear positioning and for locking of the configured inner tube with respect to the outer tube.

1 Claim, 12 Drawing Sheets

US 6,189,843 B1

LINEAR MOTION TABLE LEG

CROSS REFERENCES TO CO-PENDING APPLICATIONS

None.

BACKGROUND OF THE INVENTION

1. Field of the Invention

The present invention pertains to a table leg, and more particularly relates to a table leg incorporating a linear motion assembly which allows adjustability of the height of a table top supported by the table leg.

2. Description of the Prior Art

None.

SUMMARY OF THE INVENTION

The general purpose of the present invention is to provide a linear motion table leg which is adjustable through a vertical range. A linear motion assembly aligns between a base and a mounting plate to which a table top can be suitably secured. The linear motion assembly includes a configured inner tube adjustably aligned substantially concentrically within an outer tube. Arrays of rollers contained in race cages interface between arced surfaces located on the configured inner tube and the inner circumference of the outer tube at 120° to provide for rollered triangulated-like coupling of the configured inner tube and the outer tube. One such array of rollers includes split roller assemblies having opposing roller segments which are spring loaded outwardly in opposition to ultimately force the remaining arrays of rollers against the inner circumference of the outer tube to provide contact of tangential nature as well as providing for additional tangential contact between the arrayed rollers and the configured inner tube. A gas spring and an associated actuation assembly provide for vertical positioning of the configured inner tube with respect to the fixed outer tube to adjust the height of an attached table top.

According to a preferred embodiment of the present invention there is provided a linear motion table leg having a linear motion assembly located between a base and a table top mounting plate. An outer tube, a configured inner tube, arrays of rollers, a gas spring, a gas spring actuation assembly, a pivot mount and other components comprise the linear motion assembly.

One significant aspect and feature of the present invention is a linear motion table leg having a linear motion assembly.

Another significant aspect and feature of the present invention is a linear motion assembly having arrays of rollers interfacing between a configured inner tube and an outer tube which align and guide the configured inner tube within the outer tube.

Another significant aspect and feature of the present invention is tangential contact of one or more roller arrays with the inner circumference of the outer tube and tangential contact with arced surfaces of a configured inner tube.

Another significant aspect and feature of the present invention is the inclusion of rollers which are split and forced outwardly from each other along and about an axis.

Another significant aspect and feature of the present invention is the inclusion of rollers which are forced by spring action of an array of spring loaded rollers against the inner circumference of the outer tube.

Another significant aspect and feature of the present invention is the triangulated orientation of an array of spring loaded rollers in concert with two arrays of solid rollers.

Another significant aspect and feature of the present invention is the use of spring loaded rollers and solid rollers which automatically self-align between an outer tube and a configured inner tube to provide sufficient and stable interfacing therebetween.

Having thus described an embodiment of the present invention, it is the primary objective hereof to provide a linear motion table leg.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED PTION OF THE PREFERRED EMBODIMENT

Figure 1:
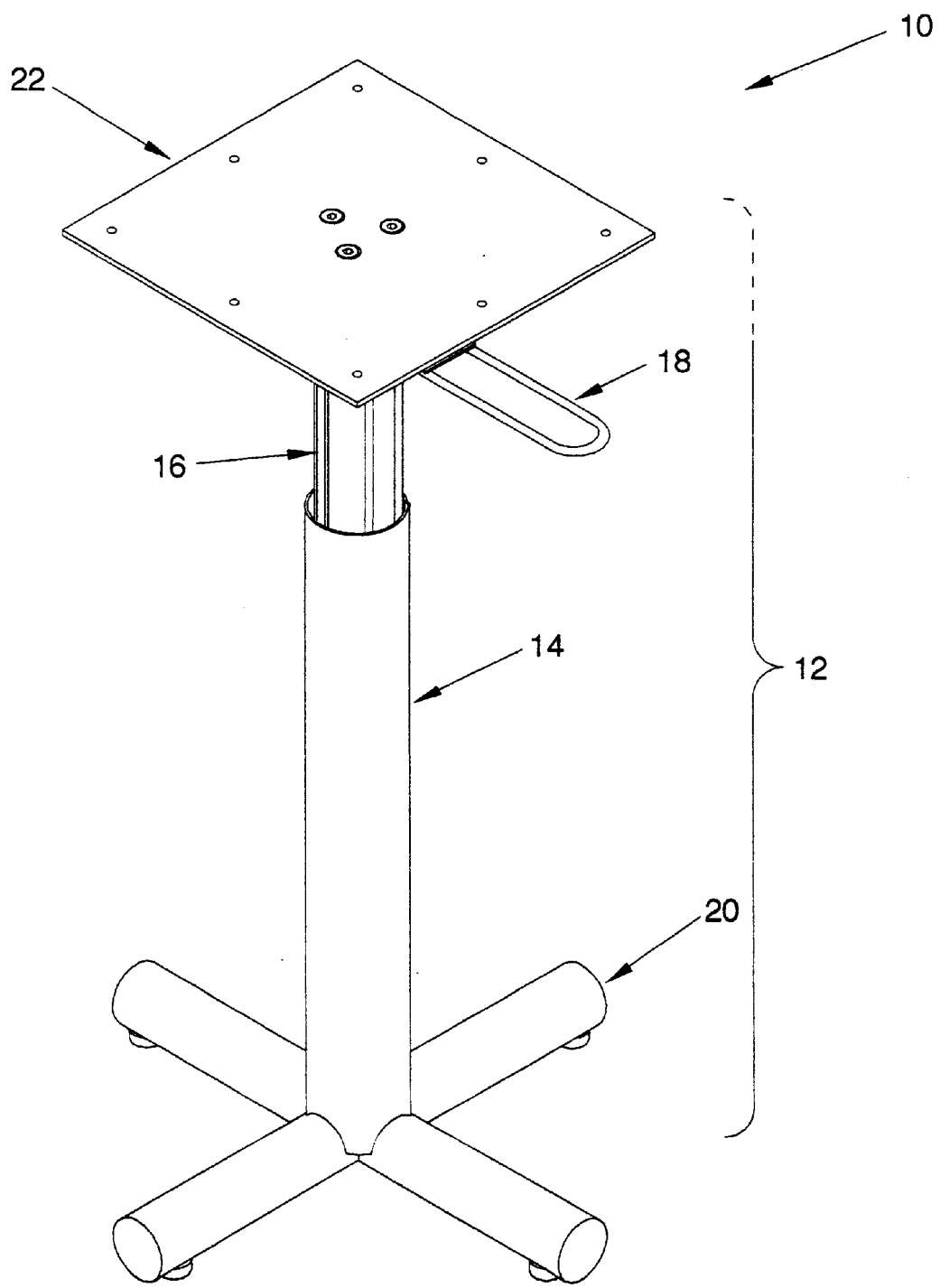
FIG. 1 illustrates an isometric view of a linear motion table leg, the present invention.

FIG. 1 illustrates an isometric view of a linear motion table leg 10, the present invention. Partially visible or fully visible components in the illustration include a vertically oriented linear motion assembly 12, components of the vertically oriented linear motion assembly 12 including an outer tube 14, a configured inner tube 16 and an actuation assembly 18; a base 20 which supports the vertically oriented linear motion assembly 12, and a mounting plate 22 secured to the top of the vertically oriented linear motion assembly 12. The configured inner tube 16 aligns in and is substantially co-centered with the outer tube 14. Actuation of the actuation assembly 18 controls the operation of an internally located gas spring 24 of FIG. 2 to allow vertical positioning of the configured inner tube 16 with respect to the outer tube 14.

Figure 2:
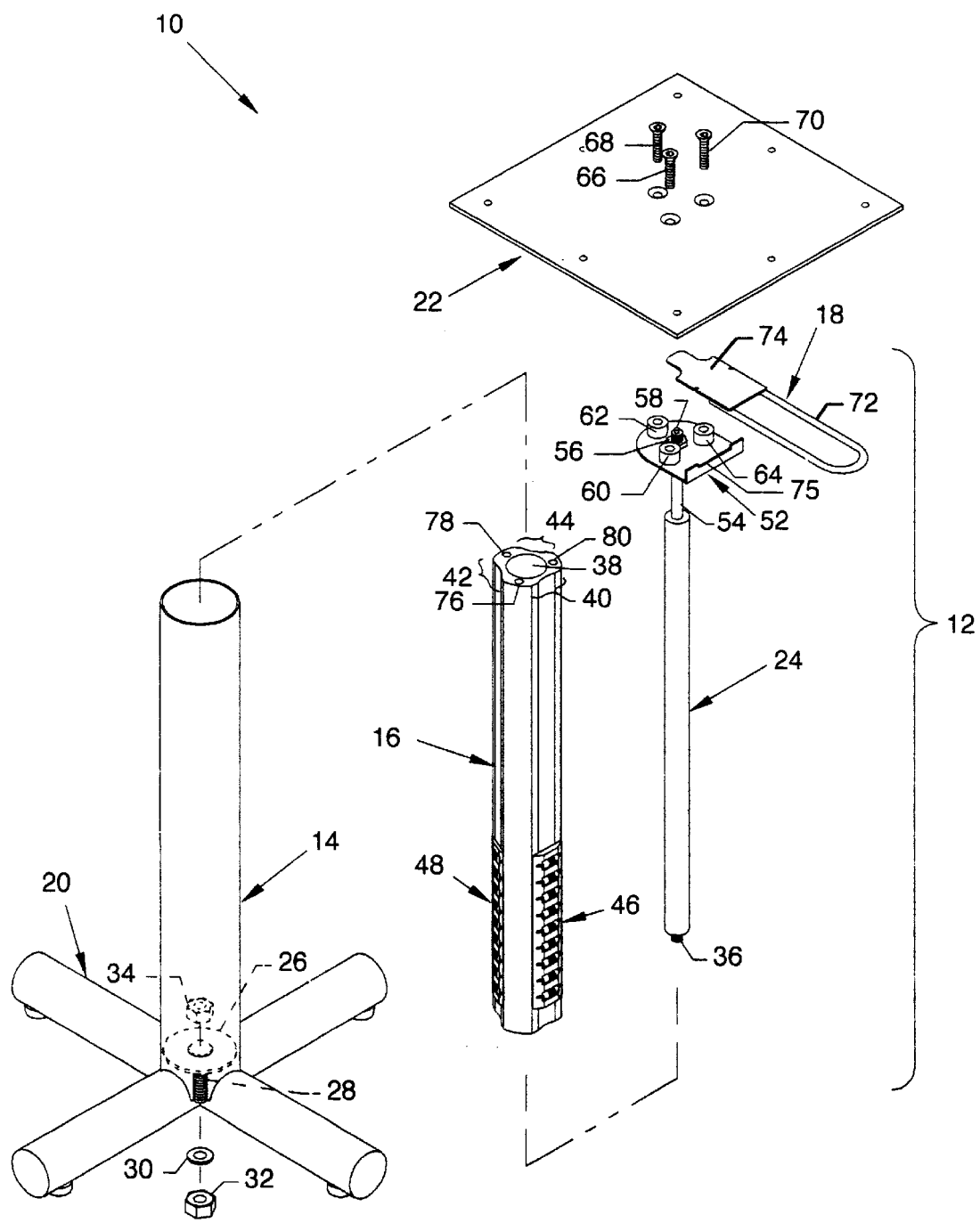
FIG. 2 illustrates an exploded isometric view of the linear motion table leg.

FIG. 2 illustrates an exploded isometric view of the linear motion table leg 10, where all numerals mentioned before correspond to those elements previously described. A round mounting plate 26 secures, such as by welding, to the lower interior of the outer tube 14. A bolt 28 passes through the round mounting plate 26 and is incorporated along with a washer 30 and a nut 32 to secure the outer tube 14 to the base 20. Another nut 34 is secured, such as by welding, to the top of the bolt 28 to serve as an anchoring fixture for the threaded shaft 36 at the lower end of the gas spring 24. Any other suitable means may be incorporated to secure the gas spring 24 to the base 20, and the use of a welded nut anchoring fixture shall not be considered to be limiting to the scope of the invention.

The configured inner tube 16 is of heavy wall construction and includes a centrally located bore 38 extending along its vertical axis to accommodate the gas spring 24. Tracks 40, 42 and 44, which are described later in detail, are located in vertical orientation at 120° intervals along and about the periphery of the configured inner tube 16. A race cage 46 having an array of spring loaded rollers aligns to the track 40 and a similarly constructed race cage 48 aligns to the track 42. Race cage 50, shown in FIG. 4, aligns in a similar fashion to the track 44.

The gas spring 24 has a pivot mounting plate 52 secured to the top of the gas spring operator rod 54 by a nut 56. An operating valve pin 58, which is co-located with the operator rod 54, extends vertically from the top of the operator rod 54. Standoffs 60, 62 and 64 are located at the top of the pivot mounting plate 52 to accommodate screws 66, 68 and 70 which secure through the mounting plate 22 and through the pivot mounting plate 52 to secure the mounting plate 22 and the pivot mounting plate 52 to the top of the configured inner tube 16 via threaded holes 76, 78 and 80, respectively, located at the top of the configured inner tube 16. The actuation assembly 18 includes a handle 72 and a connected pivot plate 74. The pivot plate 74 aligns to and pivots about a cutout 75 on the pivot mounting plate 52 to actuate the operating valve pin 58 to allow vertical positioning of the gas spring 24 and the attached configured inner tube 16.

Figure 3:
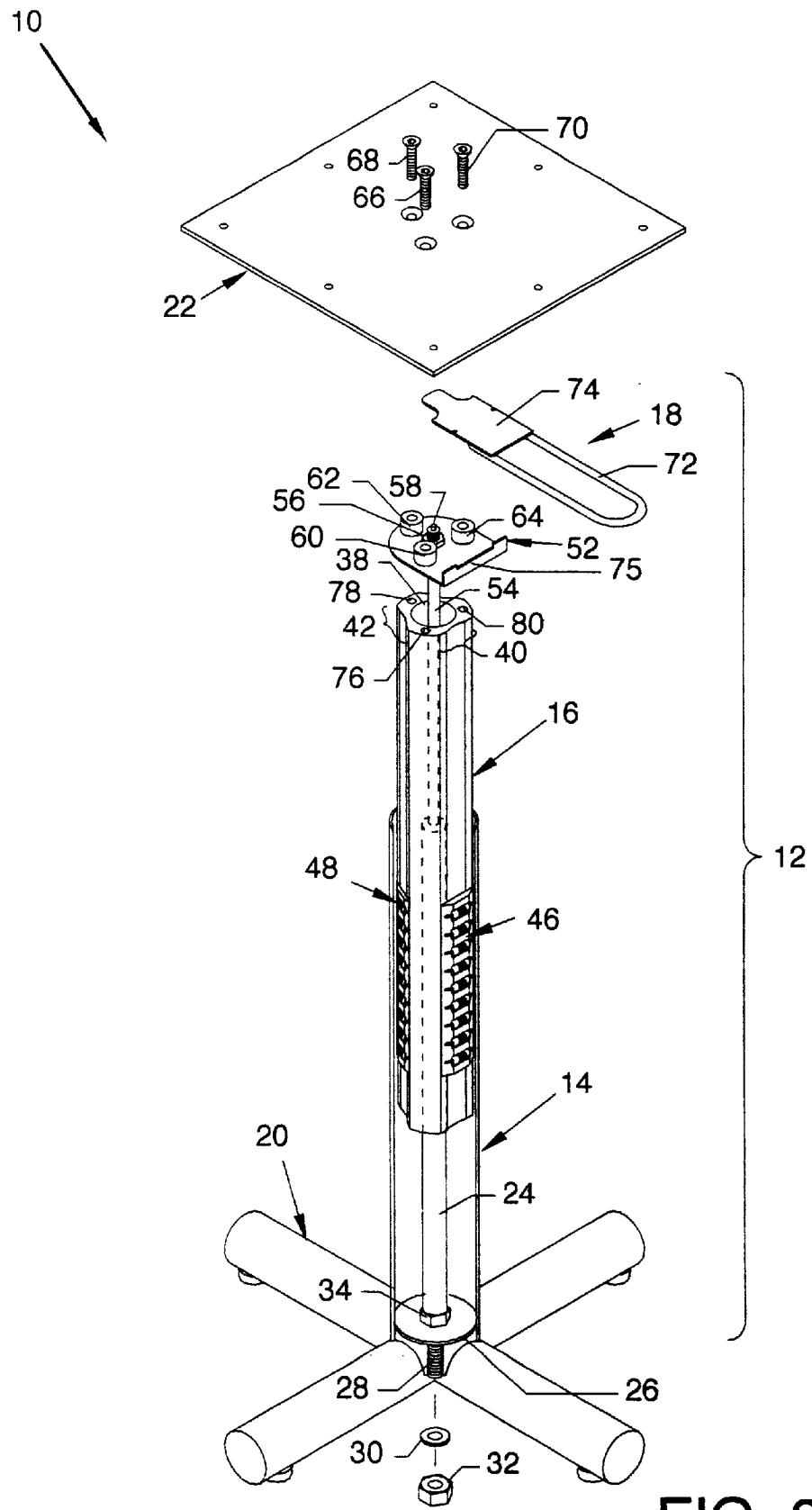
FIG. 3 illustrates a partially assembled isometric cutaway view of the linear motion table leg being in the partially extended position.

FIG. 3 illustrates a partially assembled isometric cutaway view of the linear motion table leg 10 being in the partially extended position, where all numerals mentioned before correspond to those elements previously described. Illustrated in particular is the relationship of the configured inner tube 16 to the outer tube 14. The pivot mounting plate 52 is shown slightly above the top of the configured inner tube 16 for brevity and for the sake of clarity of illustration. The configured inner tube 16 containing the gas spring 24 aligns in concentric fashion within the outer tube 14. The race cages 46, 48 and 50 (not illustrated in this figure) and roller components yet to be described provide triangular-like interfacing at 120° intervals between the outer tube 14 and the configured inner tube 16 to provide for positionable and rollerable coupling along broad and lengthy spans of the outer tube 14 and the configured inner tube 16.

Figure 4:
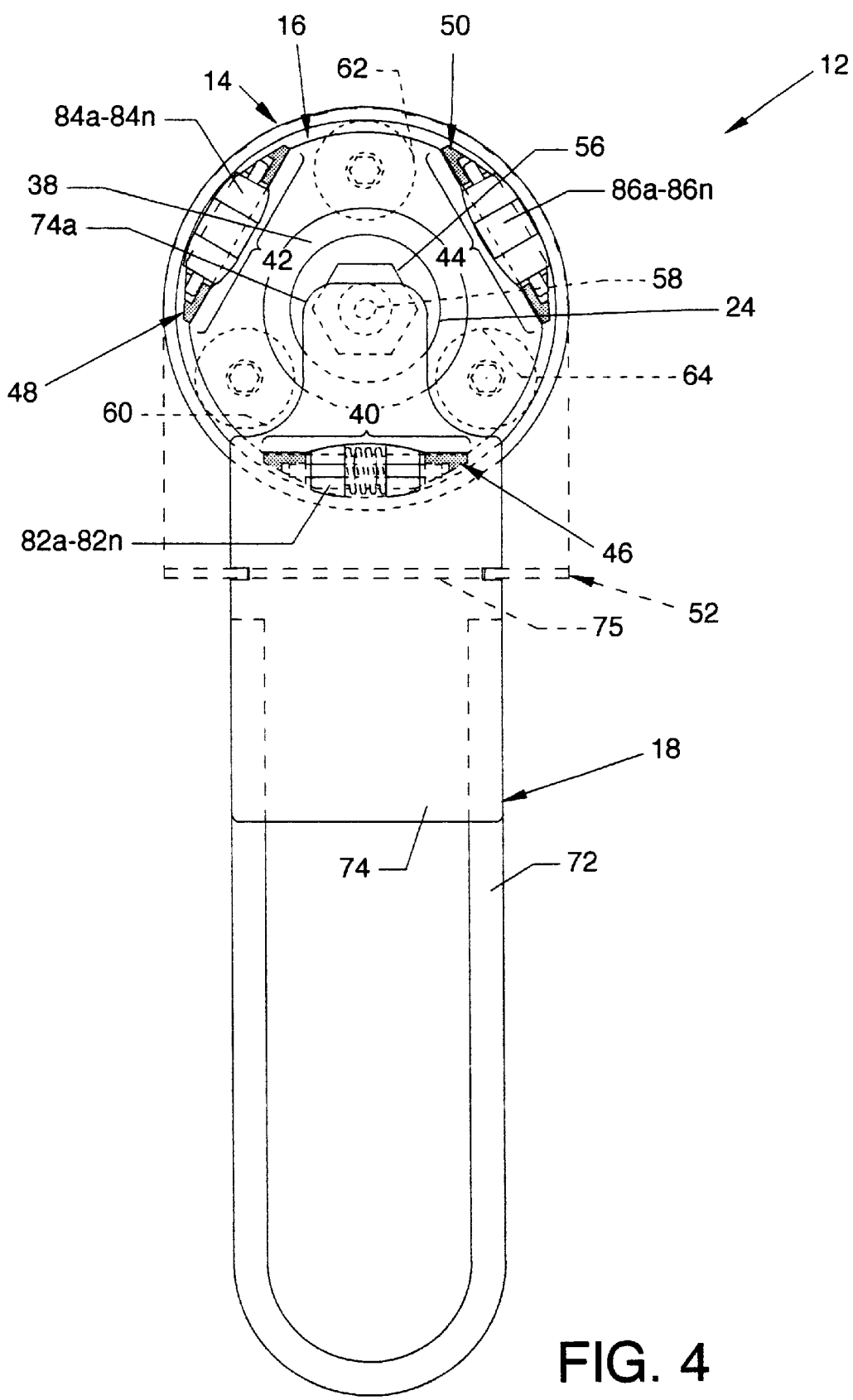
FIG. 4 illustrates a top view of the linear motion assembly.

FIG. 4 illustrates a top view of the linear motion assembly 12, where all numerals mentioned before correspond to those elements previously described. The race cages 46, 48 and 50 each contains an array of roller components including a plurality of variable geometry spring loaded rollers 82a–82n housed and contained by race cage 46, a plurality of solid rollers 84a–84n each of one-piece construction housed and contained by race cage 48, and a plurality of solid rollers 86a–86n each also of one-piece construction housed and contained by race cage 50. Surfaces of the plurality of spring loaded rollers 82a–82n, the plurality of solid rollers 84a–84n and the plurality of solid rollers 86a–86n are in intimate contact with and in engagement with both the inner circumference of the outer tube 14 and portions of the tracks 40, 42 and 44, the shape of which is later described in detail. Also illustrated is the alignment of a tab 74a of the pivot plate 74 with the operating pin valve 58 of the gas spring 24.

Figure 5:
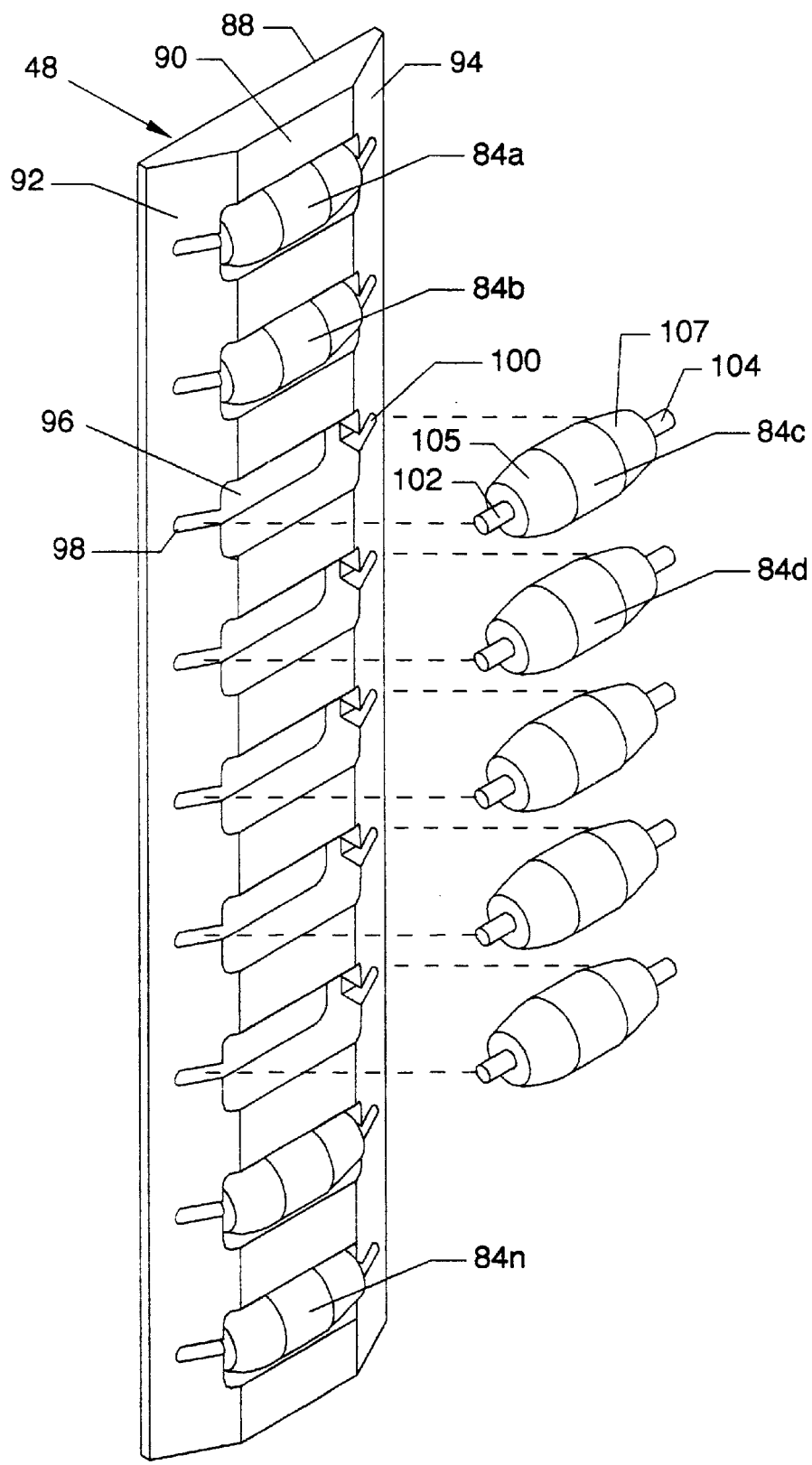
FIG. 5 illustrates an isometric view of a race cage having solid rollers.

FIG. 5 illustrates an isometric view of the race cage 48, being similar in all respects and in description to race cages 46 and 50, where all numerals mentioned before correspond to those elements previously described. The race cage 48 includes a rear surface 88, a front surface 90 and chamfered surfaces 92 and 94 extending substantially between the rear surface 88 and the front surface 90. The race cage 48 includes a plurality of open cavities 96 extending horizontally across the body of the race cage 48 between the chamfers 92 and 94 and between the rear surface 88 and the front surface 90. Horizontally opposed grooves 98 and 100 extend from the chamfers 92 and 94 opening into the cavity 96 to accommodate the axles 102 and 104 of the solid rollers 84a–84n. Located inwardly from the axles 102 and 104 are tapered and arced surfaces 105 and 107. One-piece solid rollers 86a–86n, being similar in all respects and in description to the one-piece solid rollers 84a–84n, align and fit into the race cage 50 shown in FIG. 4.

Figure 6:
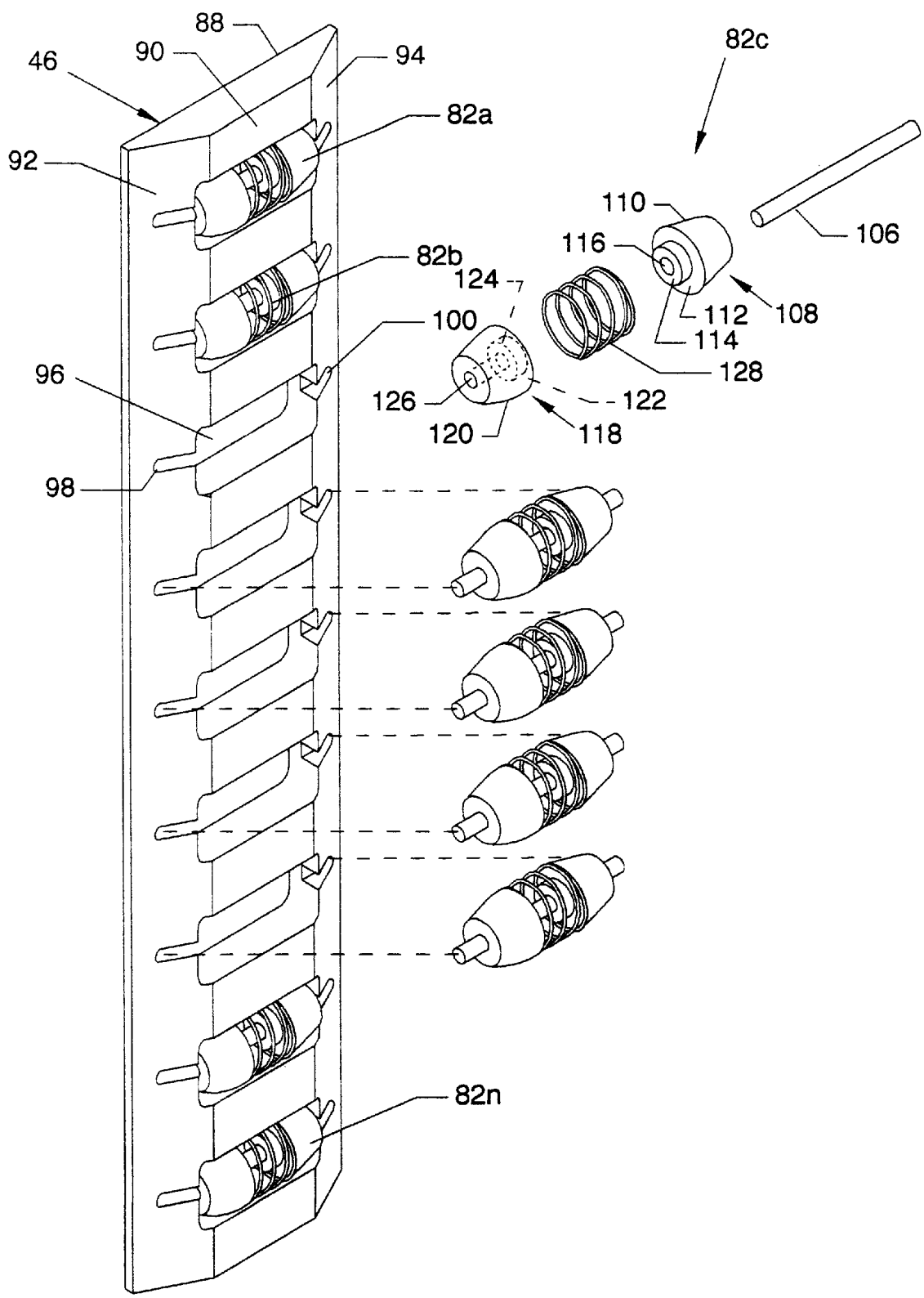
FIG. 6 illustrates an isometric view of a race cage having spring loaded rollers.

FIG. 6 illustrates an isometric view of the race cage 46, being similar in all respects and in description to race cages 48 and 50, where all numerals mentioned before correspond to those elements previously described. Spring loaded rollers 82a–82n, being similar in some and most respects to the one-piece solid rollers 84a–84n and 86a–86n, align and fit into the race cage 46, as also shown in FIG. 4. Spring loaded rollers 82a–82n have a profile closely resembling that of the one-piece solid rollers 84a–84n and 86a–86n. Spring roller 82c of the set of similar geometrically configured spring loaded rollers 82a–82n is now described. Spring roller 82c, shown in exploded view, is assembled about an axle 106 the length of which is suitable for placement and partial capture by the grooves 98 and 100 of the race cage 46. A right roller segment 108 includes a tapered and arced surface 110 having a specified radius, as later described in detail, an annular planar surface 112 located inwardly from the tapered and arced surface 110, an annular shoulder 114 extending inwardly from the annular planar surface 112, and a centrally located bore 116. A similarly shaped left roller segment 118 includes a tapered and arced surface 120 having a specified radius, as later described in detail, an annular planar surface 122 located inwardly from the tapered and arced surface 120, an annular shoulder 124 extending inwardly from the annular planar surface 122, and a centrally located bore 126. A spring 128 aligns concentric to axle 106 between the right roller segment 108 and the left roller segment 118. The bores 116 and 126 of the right roller segment 108 and the left roller segment 118, respectively, align over and about the axle 106. The ends of the spring 128 are supported by and between the annular shoulders 114 and 124 and abut the annular planar surfaces 112 and 122 of the right roller segment 108 and the left roller segment 118, respectively. Spring 128 is appropriately sized and of sufficient strength to exert pressure to force the right roller segment 108 and the left roller segment 118 outwardly and along the axis described by the axle 106.

Figure 7:
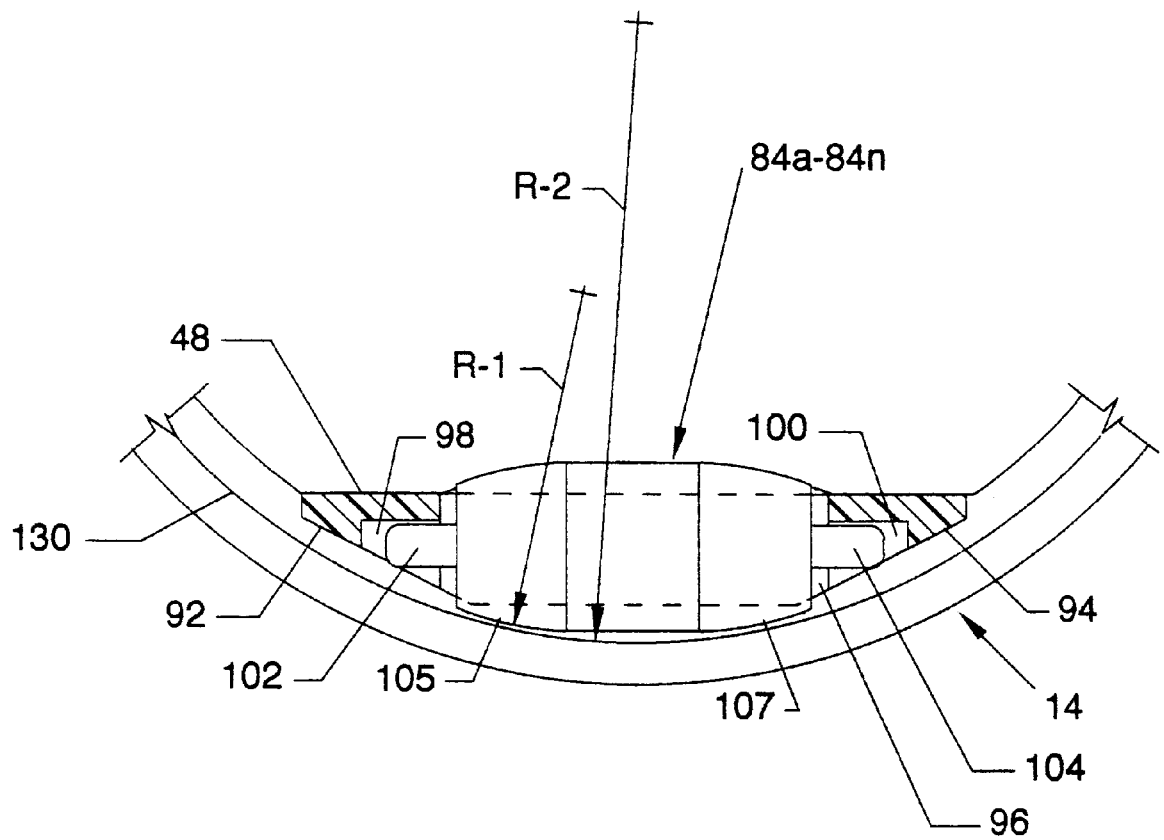
FIG. 7 illustrates a top section view of the race cage and the plurality of solid rollers.

FIG. 7 illustrates a top section view of the race cage 48 and the plurality of solid rollers 84a–84n, shown slightly offset upwardly for purposes of illustration, engaging the inner circumference 130 of the outer tube 14, where all numerals mentioned before correspond to those elements previously described. The plurality of solid rollers 84a–84n extend outwardly beyond the cavities 96 of the race cage 48 to tangentially contact the inner circumference 130 of the outer tube 14. The tapered and arced surfaces 105 and 107 are each fashioned to include a radius R–1 where the radius R–1 is smaller than the radius R–2 of the inner surface of the outer tube 14 to provide tangential and rolling contact at and between the tapered and arced surfaces 105 and 107 and the inner circumference 130 of the outer tube 14. The race cage 50 and the plurality of solid rollers 86a–86n align in a similar fashion.

Figure 8:
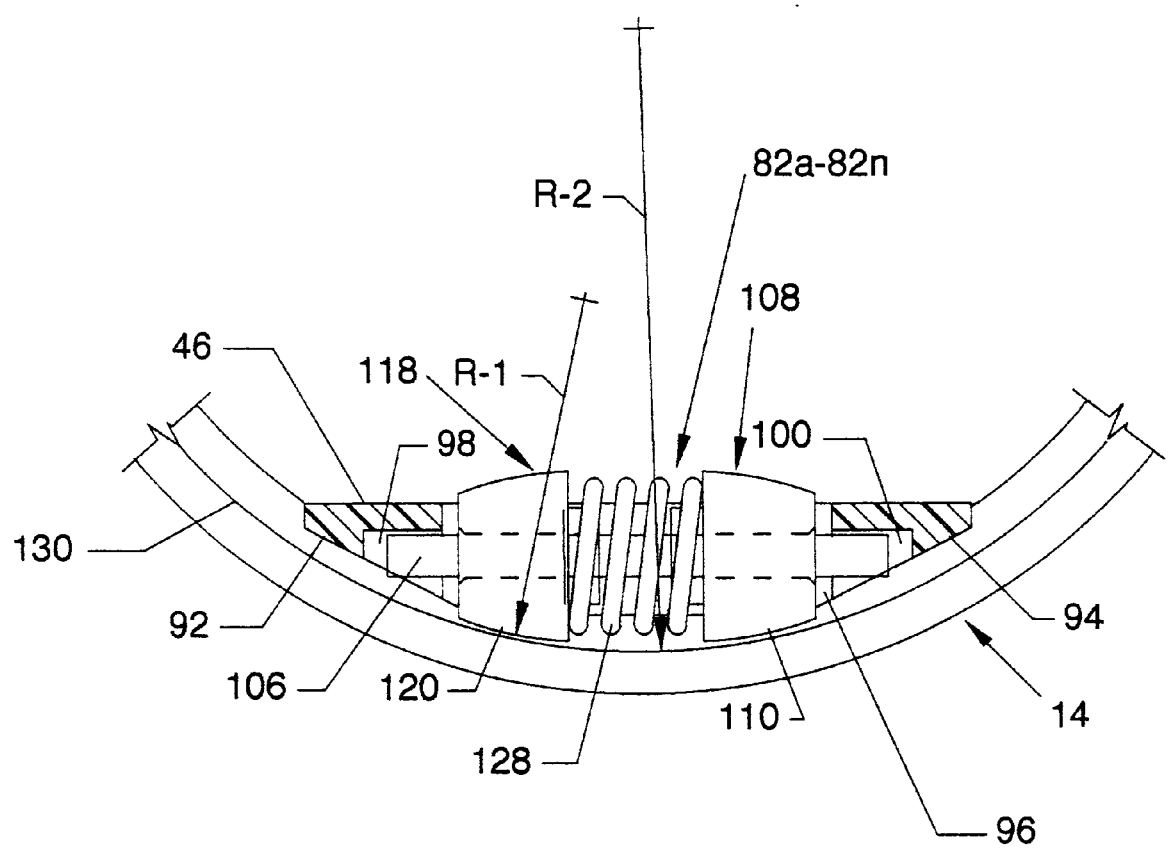
FIG. 8 illustrates a top section view of the race cage and the plurality of spring rollers.

FIG. 8 illustrates a top section view of the race cage 46 and the plurality of spring loaded rollers 82a–82n, shown slightly offset upwardly for purposes of illustration, engaging the inner circumference 130 of the outer tube 14, where all numerals mentioned before correspond to those elements previously described. The plurality of spring loaded rollers 82a–82n aligns substantially in the same manner as prescribed for the solid rollers 84a–84n as described in relation to FIG. 7. The plurality of spring loaded rollers 82a–82n extends outwardly beyond the cavities 96 of the race cage 46 to tangentially contact the inner circumference 130 of the outer tube 14. The tapered and arced surfaces 110 and 120 are fashioned to include a radius R–1, the same radius as found in FIG. 7, where the radius R–1 is smaller than the radius R–2, the same radius R–2 found in FIG. 7, of the inner surface of the outer tube 14 to provide tangential and rolling contact at and between the tapered and arced surfaces 110 and 120 and the inner circumference 130 of the outer tube 14. Tangential contacting prevents and minimizes the possibility of gouging and roller edge induced wear or scored lines on contacting surfaces. The difference of radius R–1 and R–2 in tangential contact allows proper fit and function of the linear motion assembly 12 when the configured inner tube 16 and the outer tube 14 vary in tolerance without the requirement for more expensive precision machined components.

Figure 9:
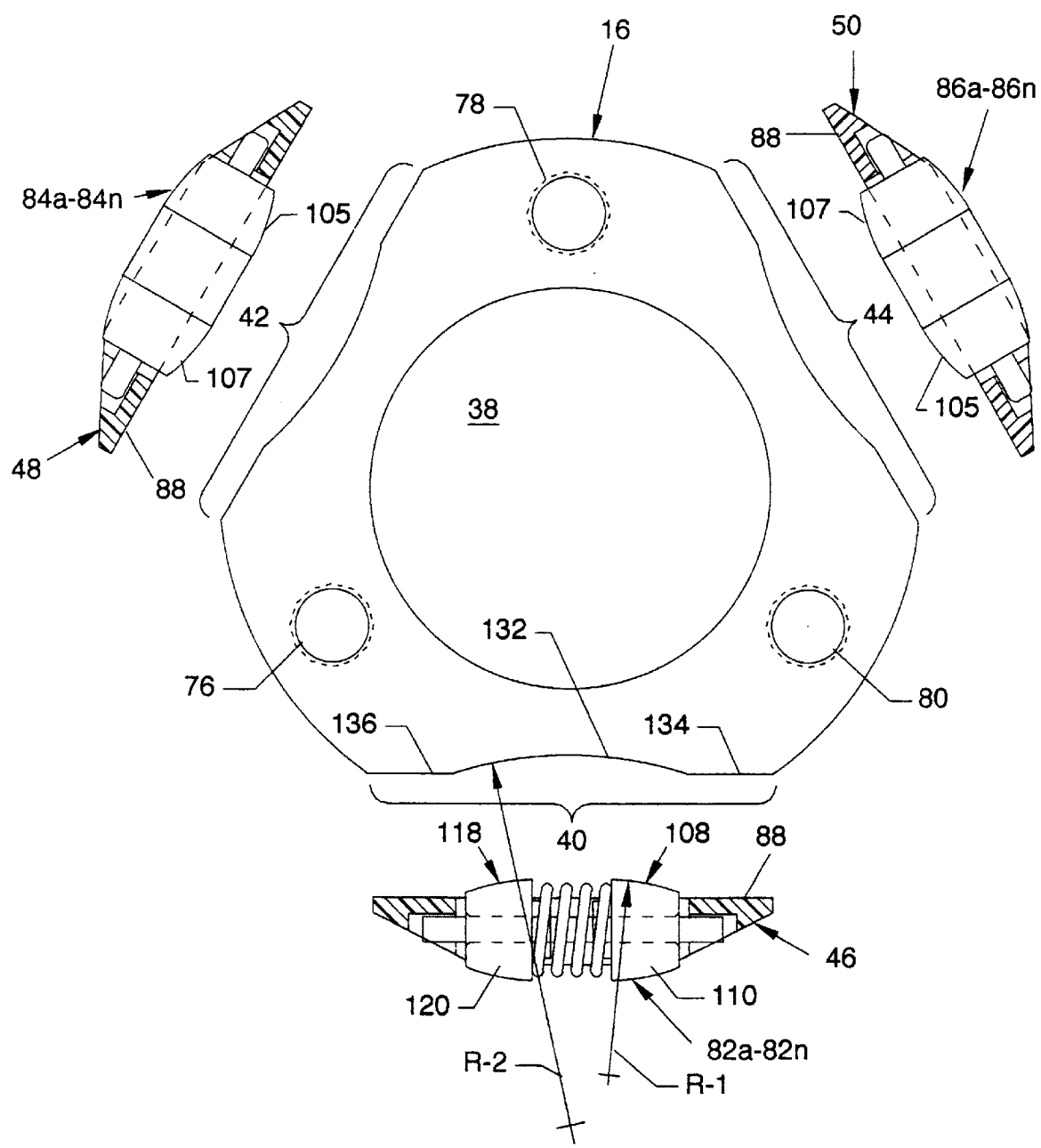
FIG. 9 illustrates a top view in partial cross section of the race cages containing pluralities of spring rollers and solid rollers shown offset from a configured inner tube.

FIG. 9 illustrates a top view in partial cross section of the race cages 46, 48 and 50 correspondingly containing pluralities of spring loaded rollers 82a–82n and solid rollers 84a–84n and 86a–86n shown offset from the configured inner tube 16 for purposes of illustration, where all numerals mentioned before correspond to those elements previously described. Tracks 40, 42 and 44 are similarly shaped to accommodate the race cages 46, 48 and 50 and correspondingly contained pluralities of spring loaded rollers 82a–82n and solid rollers 84a–84n and 86a–86n. Track 40 is now described. An arced surface 132 having a radius R–2 similar and equal to the radius R–2 of FIGS. 7 and 8 (i.e., the radius of the inner circumference 130 of the outer tube 14) is flanked on each side by planar surfaces 134 and 136. The same relationship of R–2 to R–1 (of each tapered and arced surface) as previously described in FIGS. 7 and 8 exists where the smaller radius (R–1) of the tapered and arced surface provides for tangential and intimate contact with a larger radius surface having a larger radius R–2. Planar surfaces 134 and 136 slidingly accommodate the rear surface 88 of the race cage 46. The profiles of the spring loaded rollers 82a–82n and solid rollers 84a–84n and 86a–86n extend inwardly beyond the cavities 96 of the race cages 46, 48 and 50 whereby the spring loaded rollers 82a–82n and the solid rollers 84a–84n and 86a–86n tangentially and rollingly contact the arced surface(s) 132 of the configured inner tube 16 in a manner previously described and as illustrated in FIG. 10.

Figure 10:
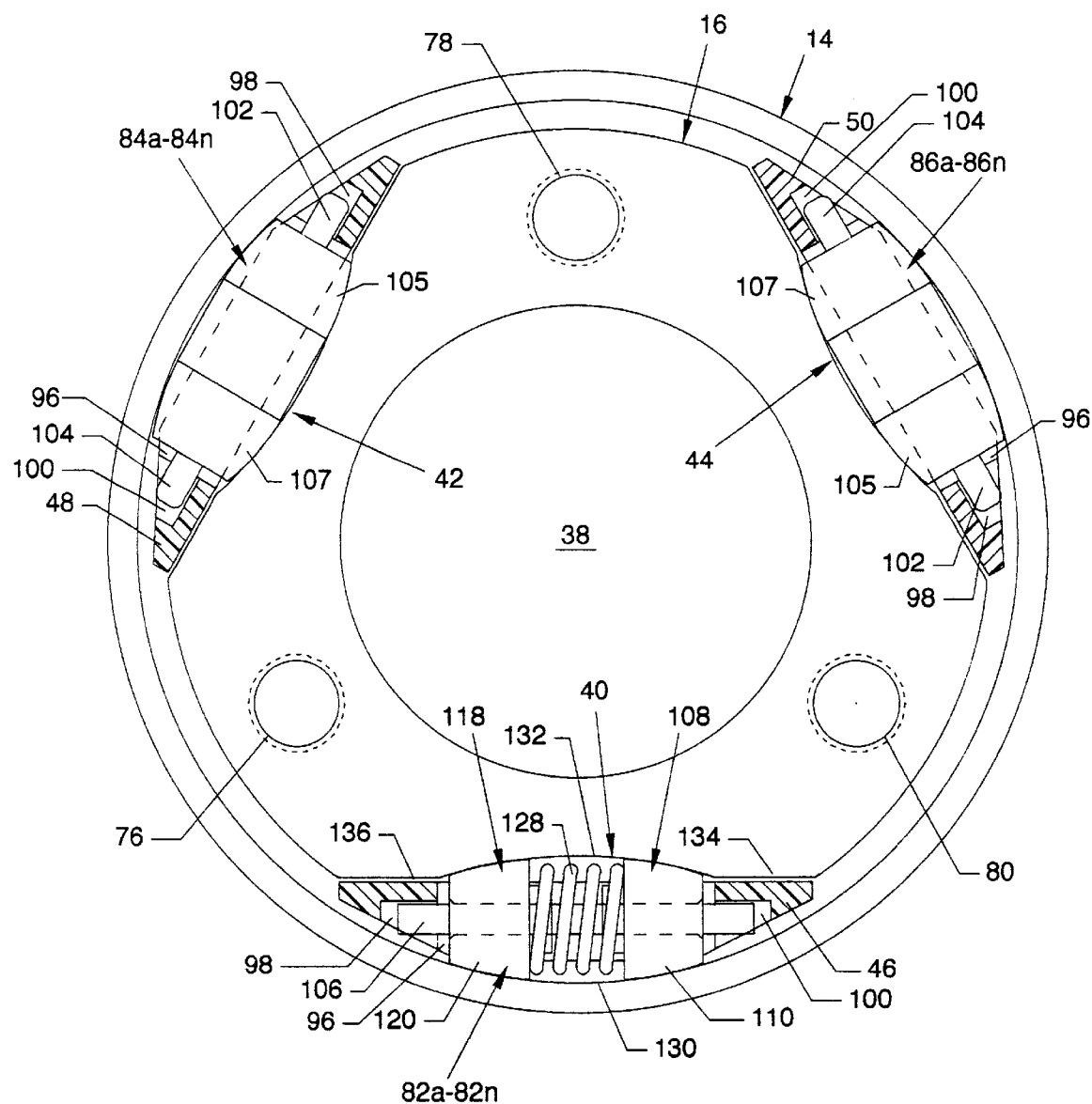
FIG. 10 illustrates a top view in partial cross section of the race cages containing pluralities of spring loaded rollers and solid rollers in accommodational alignment between the configured inner tube and an outer tube.

FIG. 10 illustrates a top view in partial cross section of the race cages 46, 48 and 50 correspondingly containing pluralities of spring loaded rollers 82a–82n and solid rollers 84a–84n and 86a–86n in accommodational alignment between the configured inner tube 16 and the outer tube 14, where all numerals mentioned before correspond to those elements previously described. Spring 128 forces the right roller segment 108 and the left roller segment 118 outwardly along the axle 106 in opposing directions to bring the tapered and arced surfaces 110 and 120 to bear at different points on and along the tapered and arced surfaces 110 and 120 against the inner circumference 130 of the outer tube 14 and against the arced surface 132 of the configured inner tube 16, the force of which depends on the loading of spring 128. Outward and lateral oppositional movement of the right roller segment 108 and the left roller segment 118 provides for constantly applied and intimate contact of all roller type components including the spring loaded rollers 82a–82n, the solid rollers 84a–84n and the solid rollers 86a–86n with the inner circumference 130 of the inner tube 14 in that outwardly forced positioning of the right roller segment 108 and the left roller segment 118 provides for forcing of the spring loaded rollers 82a–82n inwardly toward the center of the linear motion assembly 12, thereby causing forced intimate contact of the solid rollers 84a–84n and the solid rollers 86a–86n with the inner circumference 130 of the outer tube 14. Six multiple tangential points of forced and spring loaded contact of the spring loaded rollers 82a–82n, the solid rollers 84a–84n and solid rollers 86a–86n with the inner circumference 130 of the outer tube 14 provides for exceptional resistance to torquing about the vertical axis of the outer tube 14 with reference to the configured inner tube 16 without the need for additional vertical slotted guidance devices. Solid rollers 84a–84n, 86a–86n and the spring loaded rollers 82a–82n, are automatically self-aligning between the arced surface 132 of the configured inner tube 16 and the inner circumference 130 of the outer tube 14, each having common sized radii. Misalignment between the common sized radii causes repositioning of the rollers toward the area of least resistance between the arced surface 132 and the inner circumference 130. Spring forces provided by the spring loaded rollers 82a–82n provide force which promotes repositioning of the rollers to the position of least resistance resulting in perpendicular alignment of the rollers to radials of the linear motion assembly 12.

The spring loaded rollers 82a–82n and solid rollers 84a–84n and 86a–86n are aligned in triangulated fashion and spaced at 120° from each other having points of tangential contact spaced a small number of degrees from each 120° radial. In the alternative, upward re-sizing of the rollers 82a–84n, 84a–84n and 86a–86n and downward dimensions of the configured inner tube 16 could offer points of tangential contact spaced at 60° increments to provide points of tangential contact of uniform spacing about the inner circumference of the outer tube 14 to provide stability utilizing wide and evenly spaced tangential contact.

MODE OF OPERATION

Figure 11:
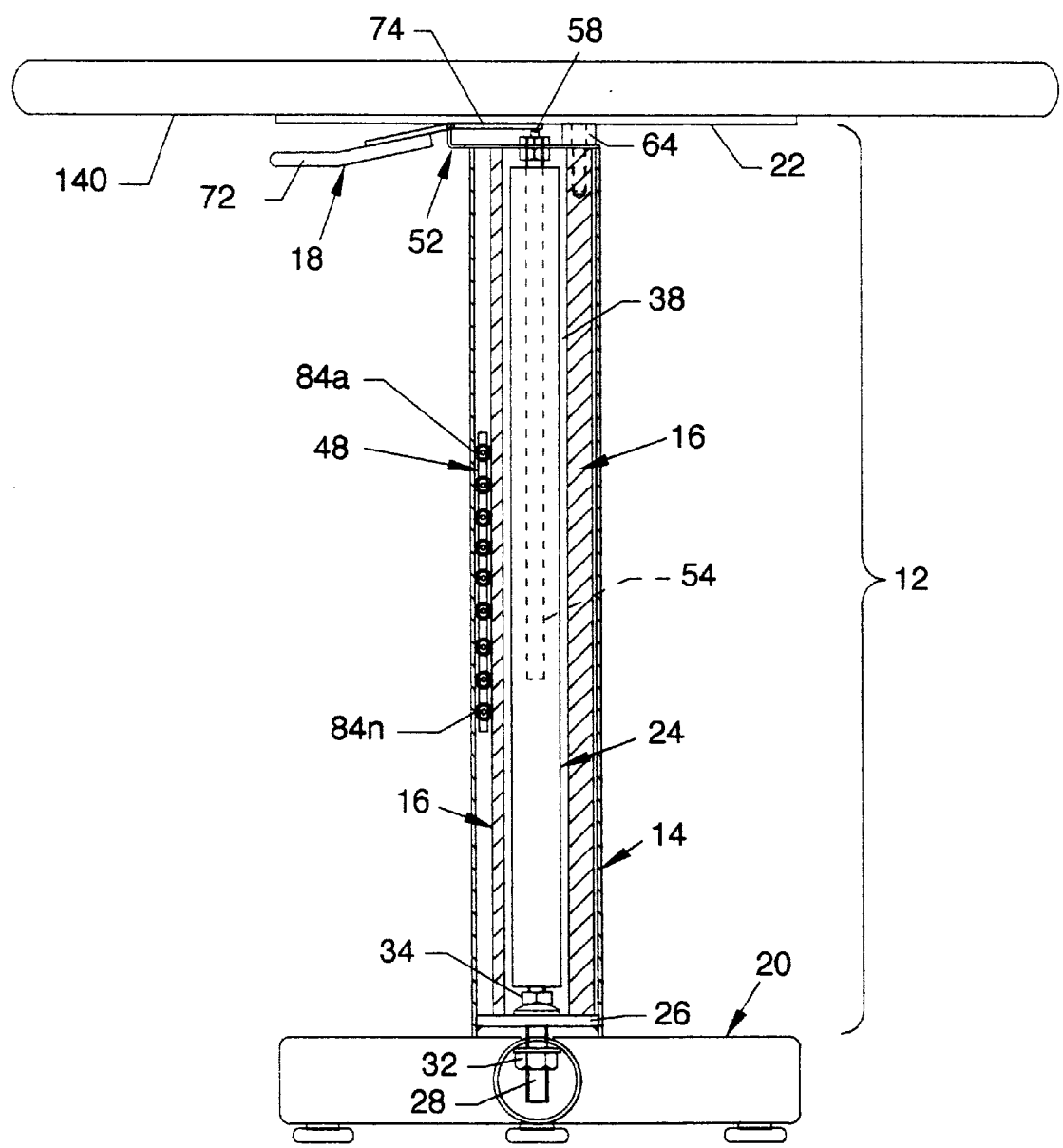
FIG. 11 illustrates, in sectional view, the mode of operation of the linear motion table leg in the minimum height position along the linear motion assembly including a table top thereupon; and, FIG. 12 illustrates, in sectional view, the mode of operation of the linear motion table leg in maximum height position along the linear motion assembly including a table top thereupon.
Figure 12:
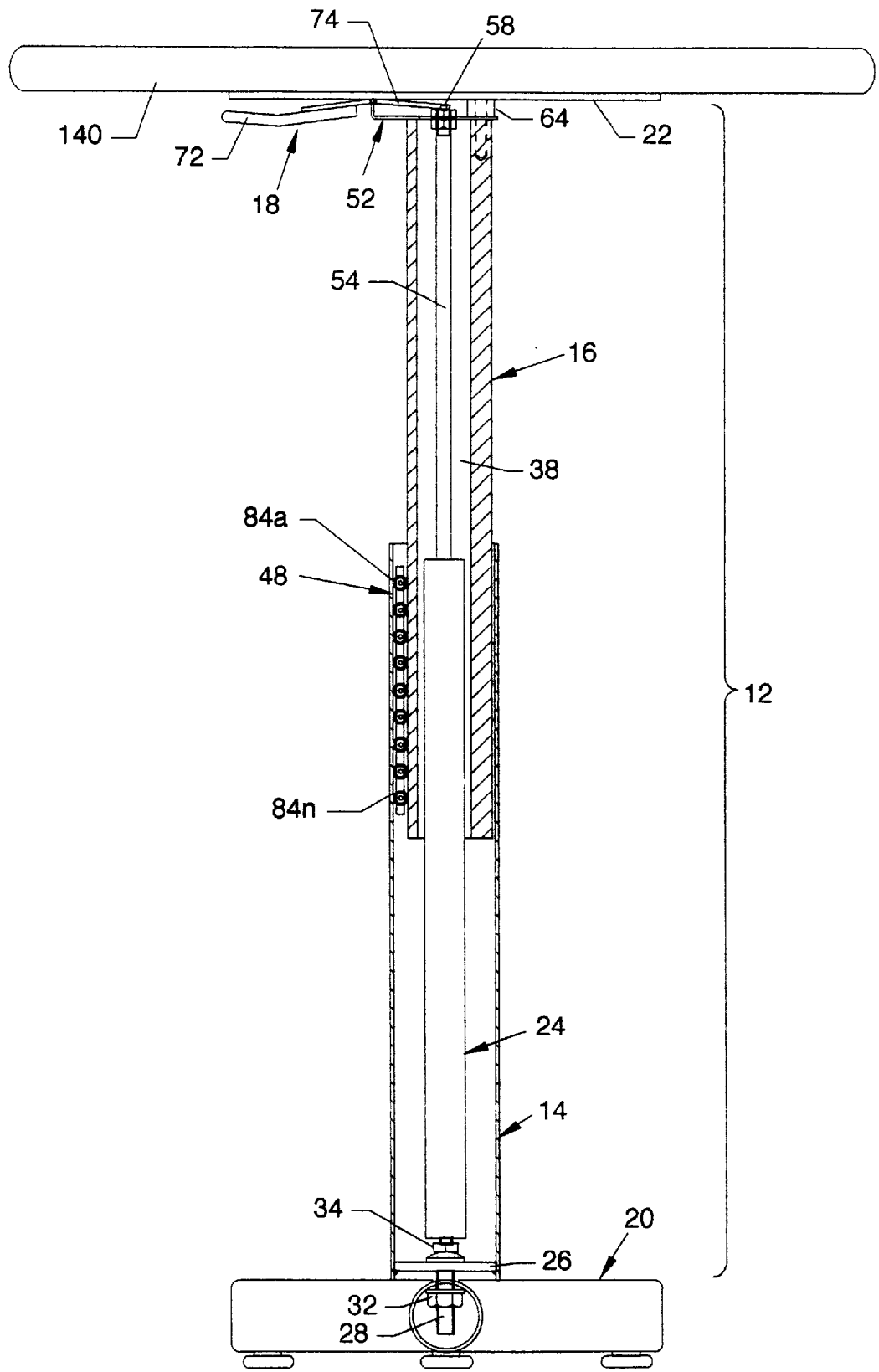

FIGS. 11 and 12 illustrate, in sectional view, the mode of operation of the linear motion table leg 10 along the linear motion assembly 12 including a table top 140 thereupon, where all numerals mentioned before correspond to those elements previously described. FIG. 11 illustrates the linear motion table leg 10 in the minimum height position and FIG. 12 illustrates the linear motion table leg 10 in the maximum height position. Of course, any intermediate position can be utilized between the minimum height position and the maximum height position shown. With reference to FIG. 11, the minimum height position, movement of the handle 72 of the actuation assembly 18 causes the pivot plate 74 to pivot about the pivot mounting plate 52 to operate the operating valve pin 58 at the top of the gas spring 24 allowing the gas spring 24 to bypass its internal locking devices and to thus urge the operator rod 54 upwardly to raise the table top 140 by extension of the configured inner tube 16 and to thus lengthen the linear motion assembly 12. Upward movement, such as provided for by the gas spring 24 of the table top 140, causes upward linear motion of the configured inner tube 16 within and along the interior of the outer tube 14. As viewed in FIG. 11 it can be seen that initially the race cages 46, 48 and 50 correspondingly containing pluralities of spring loaded rollers 82*a*–82*n* and solid rollers 84*a*–84*n* and 86*a*–86*n*, such as represented by the race cage 48 and the solid rollers 84*a*–84*n*, are positioned at a suitable distance vertically between the upper and lower regions of the outer tube 14. As the configured inner tube 16 advances in an upward direction, the spring loaded rollers 82*a*–82*n* and the solid rollers 84*a*–84*n* and 86*a*–86*n*, which are rollingly engaged between the inner circumference 130 of the outer tube 14 and the arced surfaces 132 of the configured inner tube 16, are rotated about their respective axles 102, 104 and 106 and rollingly repositioned in an upward direction at an upward rate less than that of the upwardly advancing configured inner tube 16 until reaching a position at or near the top of the outer tube 14 at a point where the configured inner tube 16 has reached a maximum height, as shown in FIG. 12, as allowed by the limitations of the gas spring 24. Upon reaching an intermediate height or the maximum height along the extended length of the linear motion assembly 12, the handle 72 of the actuation assembly 18 is released to lock the gas spring 24 at the desired position via internal locking schemes internal to the gas spring 24. Although a gas spring 24 is described and illustrated, other devices, such as manual head screws, cable assemblies, electric linear actuators or other suitable devices can be incorporated to provide for vertical positioning and stopping means of the configured inner tube 16 and the use of a gas tube shall not be construed to be limiting to the scope of the invention. Multiple vertical points of tangential contact by the vertically extending and aligned arrays of spring loaded rollers 82*a*–82*n* and solid rollers 84*a*–84*n* and 86*a*–86*n* as contained in the race cages 46, 48 and 50 provides for ample triangulated support at a sufficient distance vertically along and about the regions of multiple contacts of the spring loaded rollers 82*a*–82*n* and the solid rollers 84*a*–84*n* and 86*a*–86*n* between the outer tube 14 and the configured inner tube 16 to allow smooth and even operation of the configured inner tube 16 within the outer tube 14 even if the table top 140 is unevenly loaded, such as by having a heavy weight situated on one edge. The relationship of the vertical height of the arrays of rollers to the diameter of the configured inner tube 16 and outer tube 14 combination in combination with the force provided by the spring loaded rollers 82*a*–82*n* is such that straight and true linear motion is provided without any side load wobble during the extension or in an extended position.

Various modifications can be made to the present invention without departing from the apparent scope hereof.

LINEAR MOTION TABLE LEG PARTS LIST

| | |
|---|---|
| 10 | linear motion table leg |
| 12 | linear motion assembly |
| 14 | outer tube |
| 16 | configured inner tube |
| 18 | actuation assembly |
| 20 | base |
| 22 | mounting plate |
| 24 | gas spring |
| 26 | mounting plate |
| 28 | bolt |
| 30 | washer |
| 32 | nut |
| 34 | nut |
| 36 | threaded shaft |
| 38 | bore |
| 40 | track |
| 42 | track |
| 44 | track |
| 46 | race cage |
| 48 | race cage |
| 50 | race cage |
| 52 | pivot mounting plate |
| 54 | operator rod |
| 56 | nut |
| 58 | operating valve pin |
| 60 | standoff |
| 62 | standoff |
| 64 | standoff |
| 66 | screw |
| 68 | screw |
| 70 | screw |
| 72 | handle |
| 74 | pivot plate |
| 74a | tab |
| 75 | cutout |
| 76 | threaded hole |
| 78 | threaded hole |
| 80 | threaded hole |
| 82a–n | spring loaded rollers |
| 84a–n | solid rollers |
| 86a–n | solid rollers |
| 88 | rear surface |
| 90 | front surface |
| 92 | chamfered surface |
| 94 | chamfered surface |
| 96 | cavities |
| 98 | groove |
| 100 | groove |
| 102 | axle |
| 104 | axle |
| 105 | tapered and arced surface |
| 106 | axle |
| 107 | tapered and arced surface |
| 108 | right roller segment |
| 110 | tapered and arced surface |
| 112 | annular planar surface |
| 114 | annular shoulder |
| 116 | bore |
| 118 | left roller segment |
| 120 | tapered and arced surface |
| 122 | annular planar surface |
| 124 | annular shoulder |
| 126 | bore |
| 128 | spring |
| 130 | inner circumference |
| 132 | arced surface |
| 134 | planar surface |
| 136 | planar surface |
| 140 | table top |

What is claimed is:

1. A linear motion system for a table leg comprising:

a. an outer tube;

b. a configured inner tube including three tracks, each track having an inner radius at equal intervals about a circumference of said configured inner tube;

c. two race cage means with a plurality of solid rollers; and, d. one race cage means with a plurality of spring loaded rollers, whereby said race cage means align with respect to each other between said outer tube and said configured inner tube.

* * * * *